(12) United States Patent
Jan et al.

(10) Patent No.: US 10,256,552 B2
(45) Date of Patent: Apr. 9, 2019

(54) RADIO-FREQUENCY TRANSCEIVER SYSTEM

(71) Applicant: Wistron NeWeb Corporation, Hsinchu (TW)

(72) Inventors: Cheng-Geng Jan, Hsinchu (TW); Chieh-Sheng Hsu, Hsinchu (TW)

(73) Assignee: Wistron NeWeb Corporation, Hsinchu (TW)

( * ) Notice: Subject to any disclaimer, the term of this patent is extended or adjusted under 35 U.S.C. 154(b) by 0 days.

(21) Appl. No.: 15/166,270

(22) Filed: May 27, 2016

(65) Prior Publication Data
US 2017/0085289 A1 Mar. 23, 2017

(30) Foreign Application Priority Data
Sep. 22, 2015 (TW) .............................. 104131213 A

(51) Int. Cl.
*H01Q 1/00* (2006.01)
*H01Q 9/04* (2006.01)
*H04B 1/40* (2015.01)
(Continued)

(52) U.S. Cl.
CPC ........... *H01Q 21/065* (2013.01); *H01Q 1/246* (2013.01); *H01Q 9/285* (2013.01); *H01Q 21/24* (2013.01);
(Continued)

(58) Field of Classification Search
CPC .......... H01Q 1/22; H01Q 1/523; H01Q 3/005; H01Q 3/22; H01Q 3/26; H01Q 5/42; H01Q 9/04; H01Q 9/16; H01Q 9/26; H01Q 9/36; H01Q 19/26; H01Q 19/32; H01Q 21/064; H01Q 21/08; H01Q 21/20; H01Q 21/24; H01Q 21/29; H01Q 21/30; H01Q 25/00; H01Q 25/002; H01Q 25/005; H01Q 1/2258; H01Q 1/246; H01Q 3/2605; H01Q 3/2641; H01Q 9/0414; H01Q 9/0421;
(Continued)

(56) References Cited

U.S. PATENT DOCUMENTS 6,519,478 B1 * 2/2003 Scherzer ................ H01Q 1/246
343/725
6,972,729 B2 * 12/2005 Wang ........................ H01Q 3/44
343/833

(Continued)

FOREIGN PATENT DOCUMENTS

CN 204375980 U 6/2015
EP 2 365 585 A1 9/2011
(Continued)

*Primary Examiner* — Yuwen Pan
*Assistant Examiner* — Paul P Tran
(74) *Attorney, Agent, or Firm* — Winston Hsu

(57) ABSTRACT

A radio-frequency transceiver system, configured to support multiple-input multiple-output communication technology, includes a first complex antenna having a plurality of first antenna units; and a second complex antenna, having a plurality of second antenna units. The plurality of first antenna units and the plurality of second antenna units are regularly and alternately arranged to form an annular structure, and the first complex antenna and the second complex antenna are switched between a single-beam mode and a combined-beam mode respectively to transmit or receive radio-frequency signals.

9 Claims, 10 Drawing Sheets

(51) Int. Cl.
  *H04B 7/06* (2006.01)
  *H01Q 21/06* (2006.01)
  *H01Q 21/28* (2006.01)
  *H01Q 1/24* (2006.01)
  *H01Q 9/28* (2006.01)
  *H01Q 21/24* (2006.01)
  *H01Q 25/00* (2006.01)
  *H01Q 3/22* (2006.01)
  *H01Q 21/20* (2006.01)

(52) U.S. Cl.
  CPC ........... *H01Q 21/28* (2013.01); *H01Q 25/002* (2013.01); *H04B 7/0617* (2013.01); *H01Q 3/22* (2013.01); *H01Q 9/0421* (2013.01); *H01Q 21/205* (2013.01); *H04B 7/0695* (2013.01)

(58) Field of Classification Search
  CPC .. H01Q 9/0435; H01Q 9/0442; H01Q 9/0464; H01Q 13/0258; H01Q 13/08; H01Q 21/205; H01Q 21/245; H01Q 1/00; H01Q 1/36; H01Q 3/2682; H01Q 13/02; H01Q 13/0241; H01Q 19/106; H01Q 21/28; H04B 7/043; H04B 7/0695; H04B 7/10; H04B 7/024; H04B 7/04; H04B 7/06; H04B 7/08; H04B 7/12; H04B 1/024; H04B 1/0408; H04B 1/0413; H04B 1/043; H04B 1/0452; H04B 1/0491; H04B 1/0615; H04B 1/0617; H04B 1/0689; H04B 1/0695; H04B 1/086; H04B 1/0875; H04B 1/088; H04B 1/10; H04B 1/12; H01P 1/161; H01P 1/173; H04J 3/1694; H04L 5/14; H04L 25/022; H04L 25/0204; H04L 25/0228; H04L 25/0242; H04L 27/2601; H04W 16/00; H04W 84/12
  USPC ........... 455/63.1, 63.4, 561, 562.1; 342/373; 343/843; 370/254, 278, 328, 329, 334, 370/338, 343; 375/260, 267, 295
  See application file for complete search history.

(56) References Cited

U.S. PATENT DOCUMENTS

| | | | |
|---|---|---|---|
| 8,279,137 B2* | 10/2012 | DeJean, II | H01Q 9/0407 343/700 MS |
| 8,369,436 B2 | 2/2013 | Stirling-Gallacher | |
| 9,490,540 B1* | 11/2016 | Davies | H01Q 9/0407 |
| 2004/0077379 A1* | 4/2004 | Smith | H01Q 1/246 455/562.1 |
| 2004/0155819 A1* | 8/2004 | Martin | H01Q 1/246 343/700 MS |
| 2004/0174303 A1* | 9/2004 | Duxbury | H01Q 1/246 343/700 MS |
| 2004/0227515 A1* | 11/2004 | Nistler | G01R 33/34046 324/318 |
| 2006/0058061 A1* | 3/2006 | Nakagawa | H04L 25/0204 455/553.1 |
| 2007/0210974 A1* | 9/2007 | Chiang | H01Q 25/002 343/757 |
| 2007/0230639 A1* | 10/2007 | Stirling-Gallacher | H04B 7/0408 375/347 |
| 2008/0205509 A1* | 8/2008 | Le Naour | H04B 1/0057 375/240.01 |
| 2010/0033374 A1* | 2/2010 | van Rensburg | H01Q 1/246 342/368 |
| 2010/0164784 A1* | 7/2010 | Longstaff | G01S 13/003 342/202 |
| 2012/0214425 A1* | 8/2012 | Huang | H01Q 1/36 455/73 |
| 2014/0062788 A1* | 3/2014 | Coleman | H01Q 21/00 342/385 |

FOREIGN PATENT DOCUMENTS

| | | |
|---|---|---|
| WO | 0159876 A1 | 8/2001 |
| WO | 2010/056820 A1 | 5/2010 |
| WO | 2010056820 A1 | 5/2010 |

* cited by examiner

RADIO-FREQUENCY TRANSCEIVER SYSTEM

BACKGROUND OF THE INVENTION

1. Field of the Invention

The present invention relates to a radio-frequency transceiver system, and more particularly, to a radio-frequency transceiver system capable of solving asynchronous signal problems and field pattern shielding problems.

2. Description of the Prior Art

Electronic products with wireless communication functionalities utilize antennas to emit and receive radio waves, to transmit or exchange radio signals, so as to access a wireless communication network. With the advance of wireless communication technology, demand for transmission capacity and wireless network ability has grown dramatically in recent years. A long term evolution (LTE) wireless communication system and a wireless local area network standard IEEE 802.11n both support multi-input multi-output (MIMO) communication technology, which can vastly increase system throughput and transmission distance without increasing system bandwidth or total transmission power expenditure, thereby effectively enhancing spectral efficiency and transmission rate for the wireless communication system, as well as improving communication quality. Consequently, MIMO communication technology plays a critical role in a wireless communication system.

MIMO communication technology requires employing multiple sets of antennas to divide a space into many channels for transmitting and receiving radio signals. For example, two independent antenna transmission and reception channels are necessary to transmit and receive radio signals in 2×2 MIMO communication technology, and radio signals are transmitted and received through four independent antenna transmission and reception channels in 4×4 MIMO communication technology. Along with the increasing number of antennas, distances between the antennas would be so limited that it affects antenna field patterns or shields transmission signals, which can threaten the efficiency of MIMO communication technology. If the distances between the antennas increase, signal synchronization is the next problems to solve. Moreover, physical dimensions will also grow on a whole—this does not accommodate the trend for smaller-sized electronic products.

Therefore, it is a common goal in the industry to design antennas that suit both dimension and cost requirements and solve asynchronous signal problems and field pattern shielding problems.

SUMMARY OF THE INVENTION

Therefore, the present invention primarily provides a radio-frequency transceiver system, which suits both dimension and cost requirements and solves asynchronous signal problems and field pattern shielding problems.

An embodiment of the present invention discloses a radio-frequency transceiver system, configured to support multiple-input multiple-output communication technology, comprising a first complex antenna, comprising a plurality of first antenna units; and a second complex antenna, comprising a plurality of second antenna units; wherein the plurality of first antenna units and the plurality of second antenna units are regularly and alternately arranged to form an annular structure, and the first complex antenna and the second complex antenna are switched between a single-beam mode and a combined-beam mode respectively to transmit or receive radio-frequency signals.

An embodiment of the present invention further discloses a radio-frequency transceiver system, configured to support multiple-input multiple-output communication technology, comprising a first complex antenna, comprising a plurality of first antenna units; a second complex antenna, stacked on the first complex antenna and comprising a plurality of second antenna units; and a signal processing module, configured to integrally process signals transmitted from or received by the first complex antenna and the second complex antenna, wherein the signal processing module comprises one baseband radio processor, and signals transmitted between the first complex antenna and the baseband radio processor and between the second complex antenna and the baseband radio processor are synchronized; wherein the plurality of first antenna units and the plurality of second antenna units are regularly arranged to form an annular structure.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
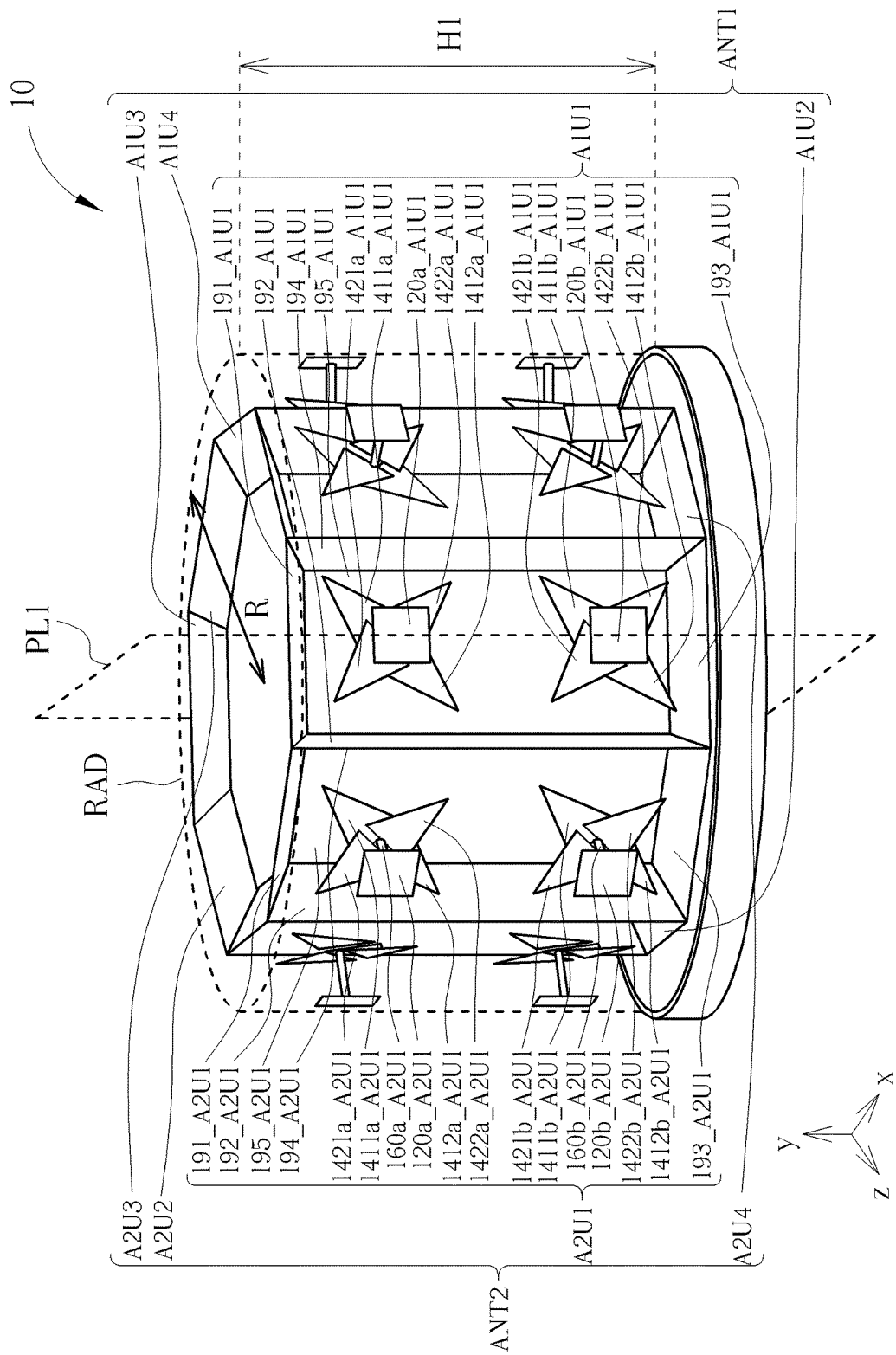
FIG. 1A is a schematic diagram illustrating a radio-frequency transceiver system according to an embodiment of the present invention.
Figure 1B:
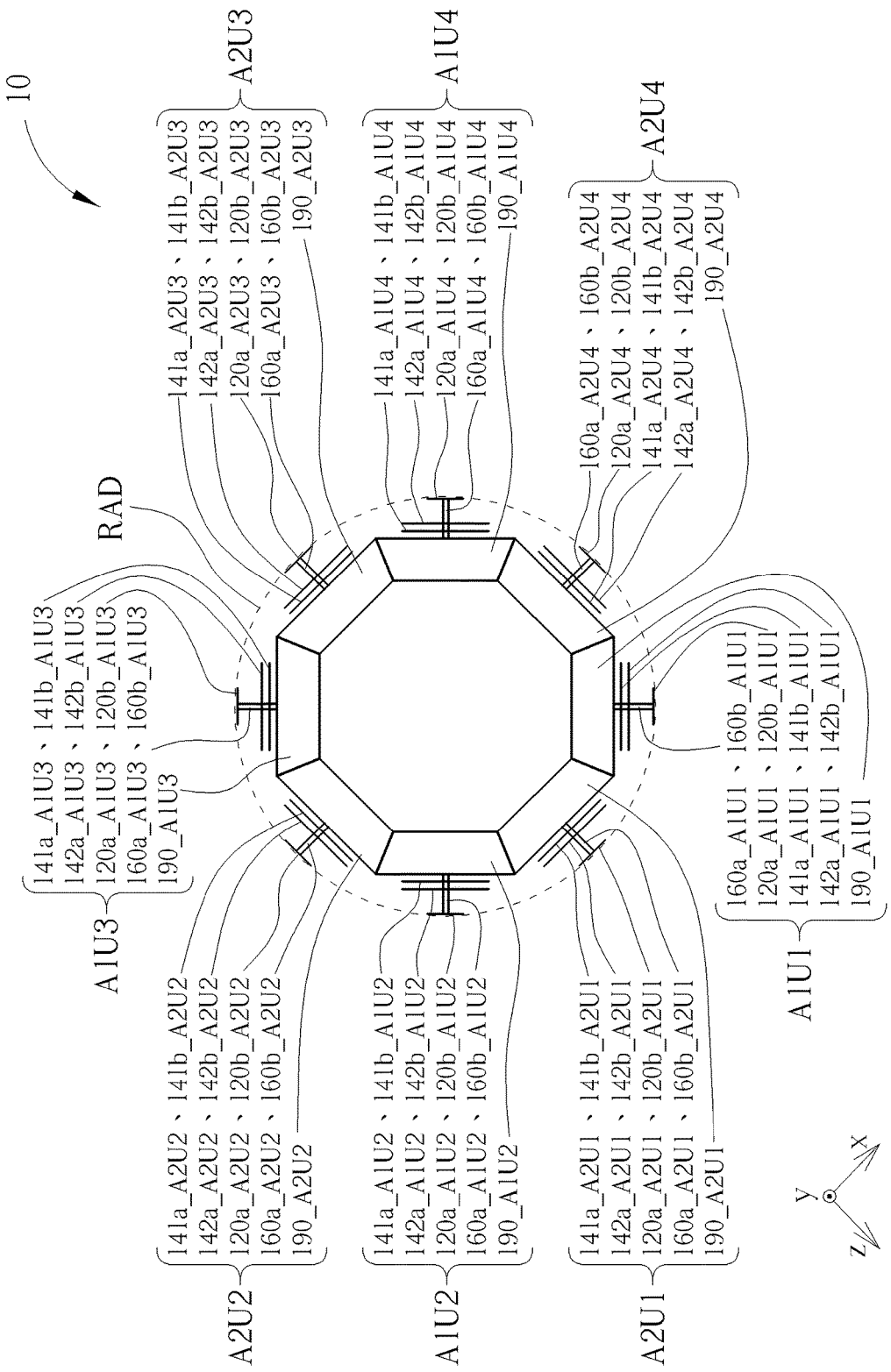
FIG. 1B is a schematic diagram illustrating a top view of the radio-frequency transceiver system shown in FIG. 1A.

Please refer to FIG. 1A and FIG. 1B. FIG. 1A is a schematic diagram illustrating a radio-frequency transceiver system 10 according to an embodiment of the present invention. FIG. 1B is a schematic diagram illustrating a top view of the radio-frequency transceiver system 10. The radio-frequency transceiver system 10 can be disposed in a cylindrical radome RAD and comprises a signal processing module (not shown), a first complex antenna ANT1 and a second complex antenna ANT2. The first complex antenna ANT1 and the second complex antenna ANT2 support 2×2 multiple-input multiple-output (MIMO) communication technology, respectively. A switching circuit (not shown) of the signal processing module manipulates the first complex antenna ANT1 and the second complex antenna ANT2 according to signal transmission directions. In this way, the first complex antenna ANT1 and the second complex antenna ANT2 provide two independent antenna transmission and reception channels respectively, and the radio-frequency transceiver system 10 can serve as a 4×4 MIMO beam switching cantenna. The first complex antenna ANT1 and the second complex antenna ANT2 comprise first antenna units A1U1, A1U2, A1U3, A1U4 and second antenna units A2U1, A2U2, A2U3, A2U4 respectively. As shown in FIG. 1B, the first antenna units A1U1 to A1U4 and the second antenna units A2U1 to A2U4 are regularly and alternately arranged to form an annular structure. Namely, each of the first antenna units is adjacently disposed between two of the second antenna units, and each of the second antenna units is adjacently disposed between two of the first antenna units. For example, the first antenna unit A1U1 is disposed between the second antenna units A2U1 and A2U4. By switching on or turning off the first antenna units A1U1 to A1U4 and the second antenna units A2U1 to A2U4, the switching circuit can switch the first complex antenna ANT1 and the second complex antenna ANT2 between a single-beam mode and a combined-beam mode so as to correctly transmit/receive radio-frequency signals. In the combined-beam mode, field patterns (or radiation patterns) of antenna units adjacent to each other (e.g., the second antenna units A2U1 and A2U4) of the second complex antenna ANT2 or the first complex antenna ANT1 can be synthesized into a composite field pattern in order to compensate for an attenuation of gain value of each individual single-beam field pattern of the adjacent antenna units (i.e., the second antenna units A2U1 and A2U4) near their intersection (e.g., the intersection plane PL1), thereby enhancing overall gain value.

In short, the first complex antenna ANT1 and the second complex antenna ANT2 share one signal processing module, and the signal processing module integrally processes signals transmitted from or received by the first complex antenna ANT1 and the second complex antenna ANT2.

Therefore, problems of synchronization failure of signals transmitted between the first complex antenna ANT1 and a baseband radio processor (not shown) of the signal processing module and between the second complex antenna ANT2 and the baseband radio processor can be prevented. Because the first antenna units A1U1 to A1U4 and the second antenna units A2U1 to A2U4 are regularly and alternately arranged to form an annular structure, the size of the radio-frequency transceiver system 10 can be smaller without shielding individual single-beam field pattern of each of the first antenna units A1U1 to A1U4 and the second antenna units A2U1 to A2U4. The first complex antenna ANT1 and the second complex antenna ANT2 are disposed in the cylindrical radome RAD completely to solve asynchronous signal problems and to reduce cost. Besides, when the first complex antenna ANT1 is switched to the single-beam mode, the second complex antenna ANT2 can be switched to the combined-beam mode; similarly, when the first complex antenna ANT1 is switched to the combined-beam mode, the second complex antenna ANT2 can be switched to the single-beam mode. In such a situation, when corresponding to the same spatial position, the envelope correlation coefficient (ECC) between the first complex antenna ANT1 and the second complex antenna ANT2 is lowered down, thereby enhancing performance of 4×4 MIMO communication technology applications of the radio-frequency transceiver system 10.

Specifically, the first antenna units A1U1 to A1U4 and the second antenna units A2U1 to A2U4 comprise reflective plates 120$a$_A1U1 to 120$b$_A1U4, 120$a$_A2U1 to 120$b$_A2U4, radiation units 141$a$_A1U1 to 142$b$_A1U4, 141$a$_A2U1 to 142$b$_A2U4, supporting elements 160$a$_A1U1 to 160$b$_A1U4, 160$a$_A2U1 to 160$b$_A2U4 and reflective units 190_A1U1 to 190_A2U4 respectively. The first antenna units A1U1 to A1U4 and the second antenna units A2U1 to A2U4 are identical and have the same structure and size so as to divide the cylindrical radome RAD up into 8 equal sections each having the same space angle. Beam overlapping patterns of the first complex antenna ANT1 and the second complex antenna ANT2 therefore have identical shape and the same magnitude and are evenly distributed to cover 360 degrees in the horizontal plane (i.e., the xz plane). However, the beam overlapping pattern of the first complex antenna ANT1 was tilted 45 degrees relative to the beam overlapping pattern of the second complex antenna ANT2 owing to the misalignment of the first complex antenna ANT1 and the second complex antenna ANT2. In other words, a projection of the radio-frequency transceiver system 10 orthogonally projected onto the horizontal plane is symmetrical with respect to 8 symmetrical axes. For the sake of brevity, details about the radio-frequency transceiver system 10 are described by focusing merely on the first antenna unit A1U1 and the second antenna unit A2U1. The reflective unit 190_A1U1 of the first antenna unit A1U1 and the reflective unit 190_A2U1 of the second antenna unit A2U1 comprise peripheral reflective elements 191_A1U1 to 194_A1U1, 191_A2U1 to 194_A2U1 and central reflective elements 195_A1U1, 195_A2U1 respectively. Each of the peripheral reflective elements 191_A1U1 to 194_A1U1 has a shape substantially conforming to an isosceles trapezoid with symmetry. Taken together, the peripheral reflective elements 191_A1U1 to 194_A1U1 enclose the central reflective element 195_A1U1 symmetrically to form a frustum structure. Similarly, each of the peripheral reflective elements 191_A2U1 to 194_A2U1 has a shape substantially conforming to an isosceles trapezoid with symmetry, and the peripheral reflective elements 191_A2U1 to 194_A2U1 enclose the central reflective element 195_A2U1 symmetrically to form a frustum structure. Here, each central reflective element (for example, the central reflective element 195_A1U1) of the first antenna units (for example, the first antenna unit A1U1) of the first complex antenna ANT1 and each central reflective element (for example, the central reflective element 195_A2U1) of the second antenna units (for example, the second antenna unit A2U1) of the second complex antenna ANT2 are perpendicular to a first plane (i.e., the horizontal plane), and hence the projection of the radio-frequency transceiver system 10 onto the first plane is symmetrical with respect to at least one symmetrical axis.

The first antenna unit A1U1 has an array antenna structure since the reflective plates, the radiation units and the supporting elements of the first antenna unit A1U1 constitute a first antenna element and a second antenna element. The first antenna element comprises the reflective plate 120a_A1U1, the radiation units 141a_A1U1, 142a_A1U1 and the supporting element 160a_A1U1; the second antenna element comprises the reflective plate 120b_A1U1, the radiation units 141b_A1U1, 142b_A1U1 and the supporting element 160b_A1U1. The reflective plates 120a_A1U1, 120b_A1U1 and the radiation units 141a_A1U1, 142a_A1U1, 141b_A1U1, 142b_A1U1 of the first antenna unit A1U1 are disposed above the central reflective element 195_A1U1 with the supporting elements 160a_A1U1, 160b_A1U1 respectively, and the reflective plates 120a_A1U1, 120b_A1U1 and the radiation units 141a_A1U1 to 142b_A1U1 are electrically isolated from the reflective unit 190_A1U1—meaning that the reflective plates 120a_A1U1, 120b_A1U1 and the radiation units 141a_A1U1 to 142b_A1U1 are not electrically connected to or contacting the reflective unit 190_A1U1. The reflective plates 120a_A1U1 and 120b_A1U1 are configured to increase effective antenna radiation area. Consequently, both a geometrical shape of the reflective plate 120a_A1U1 and a geometrical shape of the reflective plate 120b_A1U1 have symmetry, and each may be a circle or a regular polygon with vertices whose number is a multiple of 4. The radiation unit 141a_A1U1 comprises conductor plates 1411a_A1U1 and 1412a_A1U1 with symmetry to form a diamond dipole antenna structure of 45-degree slant polarized; the radiation unit 142a_A1U1 comprises conductor plates 1421a_A1U1 and 1422a_A1U1 with symmetry to form a diamond dipole antenna structure of 135-degree slant polarized. As a result, the reflective plate 120a_A1U1, the radiation units 141a_A1U1, 142a_A1U1 and the supporting element 160a_A1U1 may constitute the first antenna element which is dual-polarized to provide two sets of independent antenna transmitting and receiving channels. Likewise, together with the reflective plate 120b_A1U1 and the supporting element 160b_A1U1, conductor plates 1411b_A1U1, 1412b_A1U1 of the radiation unit 141b_A1U1 and conductor plates 1421b_A1U1, 1422b_A1U1 of the radiation unit 142b_A1U1 form a diamond dipole antenna structure of 45-degree slant polarized and a diamond dipole antenna structure of 135-degree slant polarized respectively to constitute the second antenna element which is dual-polarized. To improve common polarization to cross polarization (Co/Cx) parameter, geometrical shapes of the radiation units 141a_A1U1 to 142b_A1U1 basically have symmetry, and the first antenna unit A1U1 has symmetry on a whole.

To improve the Co/Cx parameter, the second antenna unit A2U1 also has symmetry on a whole. For example, geometrical shapes of the reflective plates 120a_A2U1 and 120b_A2U1 of the second antenna unit A2U1 have symmetry, and each of the reflective plates 120a_A2U1 and 120b_A2U1 configured to increase effective antenna radiation area may be a circle or a regular polygon with vertices whose number is a multiple of 4. Geometrical shapes of the radiation units 141a_A2U1 to 142b_A2U1 of the second antenna unit A2U1 basically have symmetry. Moreover, the reflective plates, the radiation units and the supporting elements of the second antenna unit A2U1 constitute a first antenna element and a second antenna element to form an array antenna structure. The first antenna element comprises the reflective plate 120a_A2U1, the radiation units 141a_A2U1, 142a_A2U1 and the supporting element 160a_A2U1; the second antenna element comprises the reflective plate 120b_A2U1, the radiation units 141b_A2U1, 142b_A2U1 and the supporting element 160b_A2U1. The radiation unit 141a_A2U1 comprises conductor plates 1411a_A2U1 and 1412a_A2U1 with symmetry to form a diamond dipole antenna structure of 45-degree slant polarized; the radiation unit 142a_A2U1 comprises conductor plates 1421a_A2U1 and 1422a_A2U1 with symmetry to form a diamond dipole antenna structure of 135-degree slant polarized. As a result, the reflective plate 120a_A2U1, the radiation units 141a_A2U1, 142a_A2U1 and the supporting element 160a_A2U1 may constitute the first antenna element which is dual-polarized to provide two sets of independent antenna transmitting and receiving channels. Likewise, together with the reflective plate 120b_A2U1 and the supporting element 160b_A2U1, conductor plates 1411b_A2U1, 1412b_A2U1 of the radiation unit 141b_A2U1 and conductor plates 1421b_A2U1, 1422b_A2U1 of the radiation unit 142b_A2U1 form a diamond dipole antenna structure of 45-degree slant polarized and a diamond dipole antenna structure of 135-degree slant polarized respectively to constitute the second antenna element which is dual-polarized. Furthermore, the reflective plates 120a_A2U1, 120b_A2U1 and the radiation units 141a_A2U1, 142a_A2U1, 141b_A2U1, 142b_A2U1 of the second antenna unit A2U1 are disposed above the central reflective element 195_A2U1 with the supporting elements 160a_A2U1, 160b_A2U1 respectively, and the reflective plates 120a_A2U1, 120b_A2U1 and the radiation units 141a_A2U1 to 142b_A2U1 are electrically isolated from the reflective unit 190_A2U1—meaning that the reflective plates 120a_A2U1, 120b_A2U1 and the radiation units 141a_A2U1 to 142b_A2U1 are not electrically connected to or contacting the reflective unit 190_A2U1.

Figure 2:
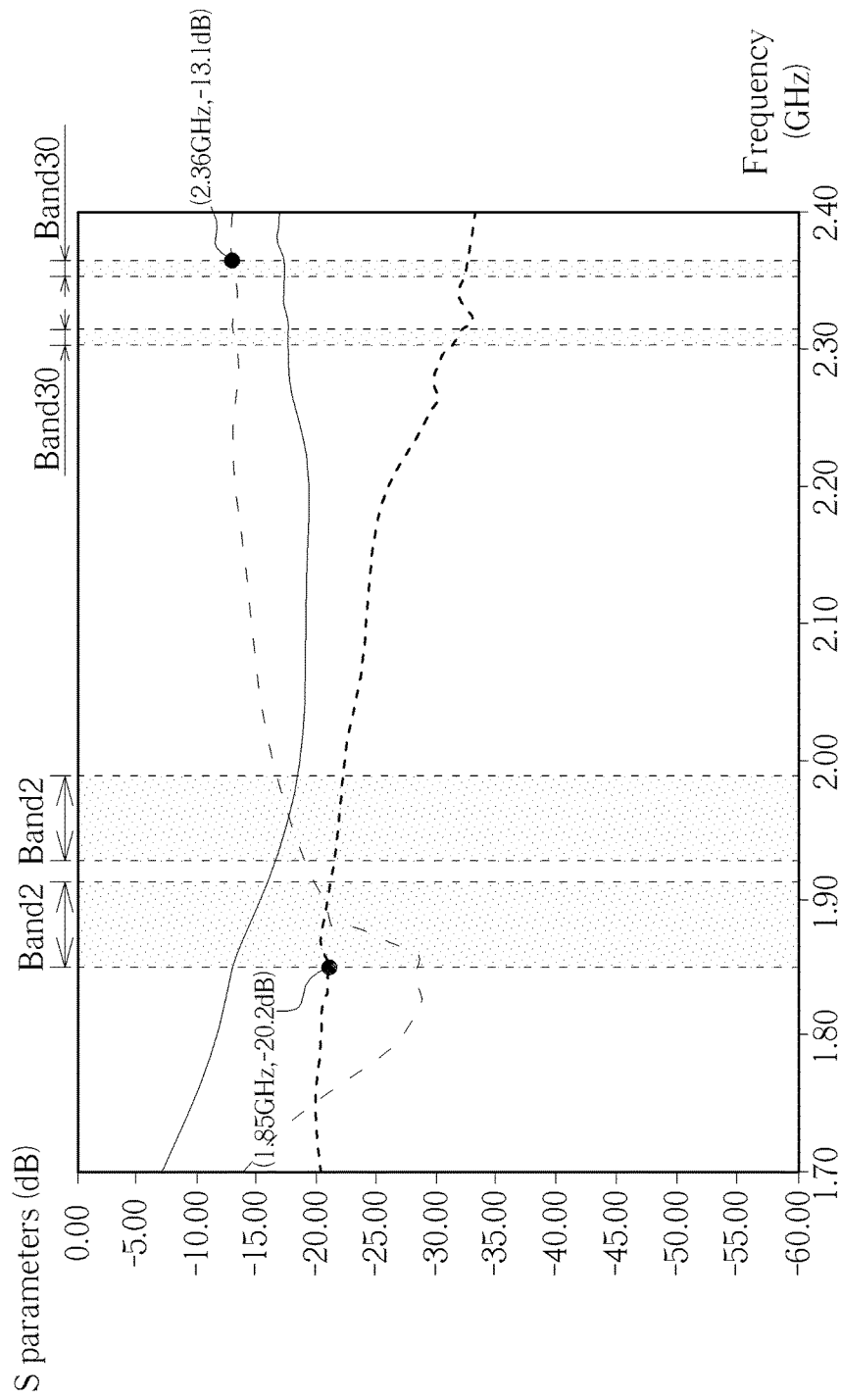
FIG. 2 is a schematic diagram illustrating antenna resonance simulation results of the radio-frequency transceiver system shown in FIG. 1A.

Simulation and measurement may be employed to verify whether the radio-frequency transceiver system 10 operated at Band 2 and Band 30 of LTE wireless communication system meets system requirements. Please refer to FIG. 2. FIG. 2 is a schematic diagram illustrating antenna resonance simulation results of the radio-frequency transceiver system 10. In FIG. 2, a height H1 and a radius R are set to 189 mm and 145.5 mm respectively. Besides, antenna resonance simulation results for a 45-degree slant polarized antenna (for example, the diamond dipole antenna structure of 45-degree slant polarized) and a 135-degree slant polarized antenna (for example, the diamond dipole antenna structure of 135-degree slant polarized) are presented by a long dashed line and a solid line respectively; antenna isolation simulation results between the 45-degree slant polarized antenna and the 135-degree slant polarized antenna is presented by a short dashed line. According to FIG. 2, within Band 2 and Band 30, return loss (i.e., S11 value) of the radio-frequency transceiver system 10 is less than −13.1 dB, and isolation is greater than 20.2 dB, which meet the LTE wireless communication system requirements of having the return loss less than −10 dB and the isolation greater than 20 dB.

Figure 3A:
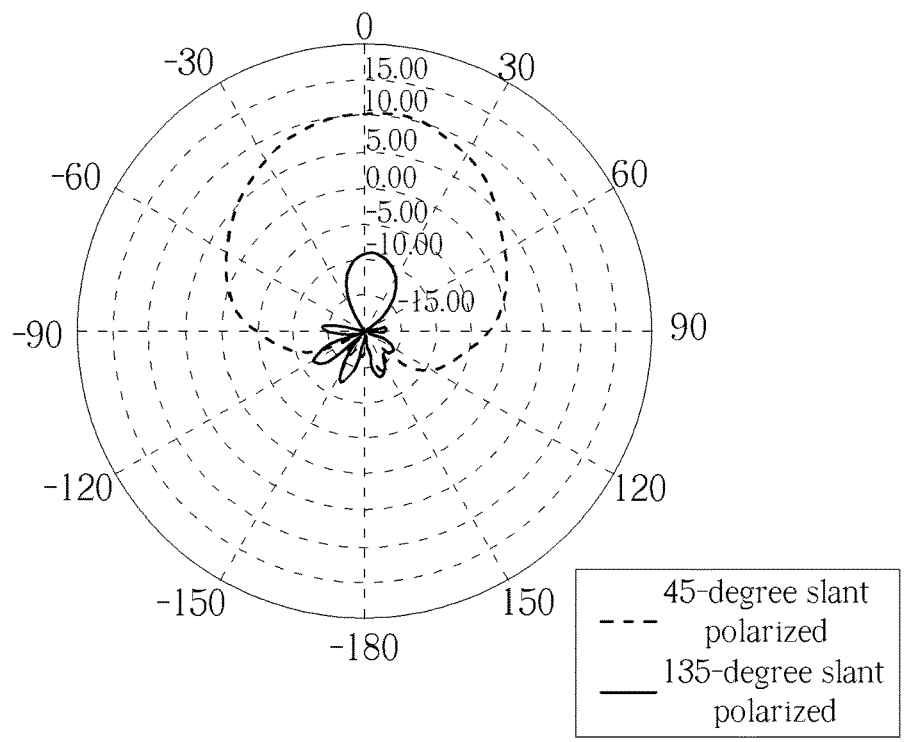
FIG. 3A is a schematic diagram illustrating radiation pattern of the 45-degree slant polarized antennas of an antenna unit of the radio-frequency transceiver system shown in FIG. 1A operated at 1.85 GHz in the horizontal plane in the single-beam mode.
Figure 3B:
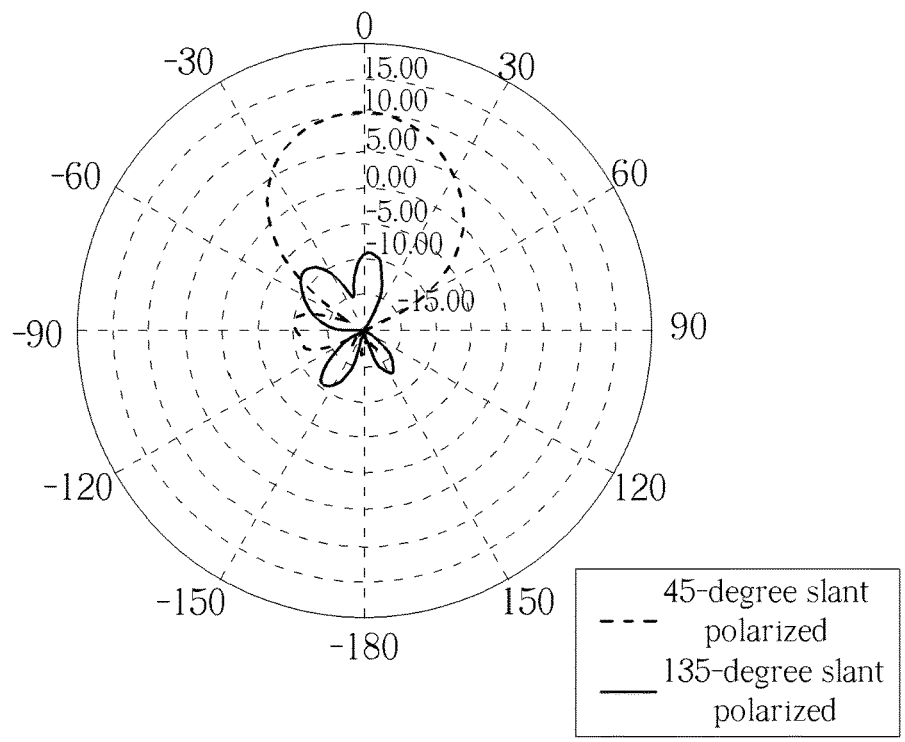
FIG. 3B is a schematic diagram illustrating radiation pattern of the 45-degree slant polarized antennas of an antenna unit of the radio-frequency transceiver system shown in FIG. 1A operated at 1.85 GHz in the vertical plane in the single-beam mode.
Figure 4A:
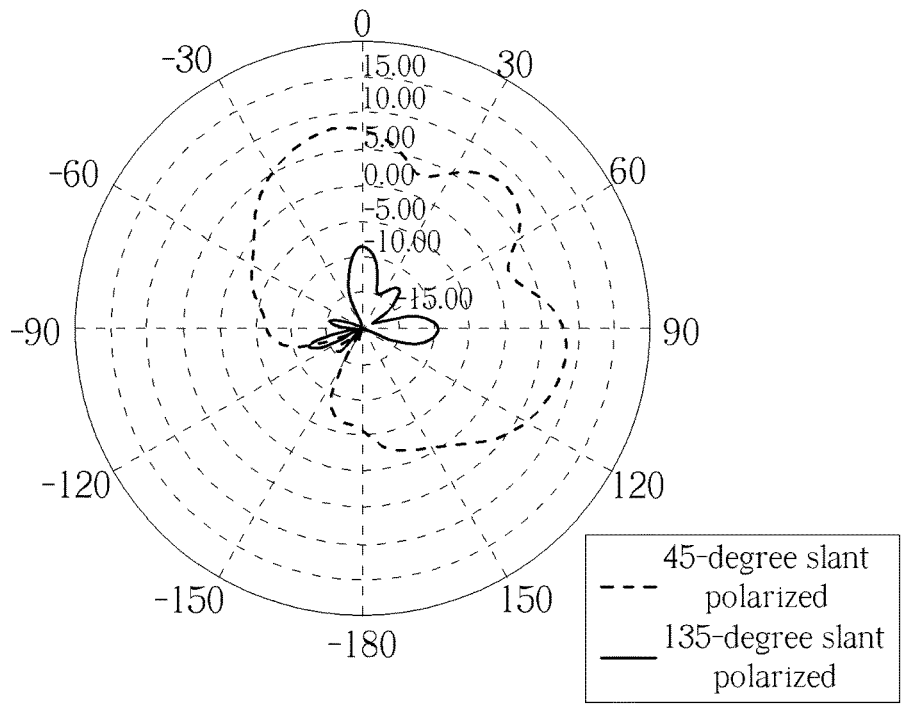
FIG. 4A is a schematic diagram illustrating radiation pattern of the 45-degree slant polarized antennas of two adjacent antenna units of the radio-frequency transceiver system shown in FIG. 1A operated at 1.85 GHz in the horizontal plane in the combined-beam mode.
Figure 4B:
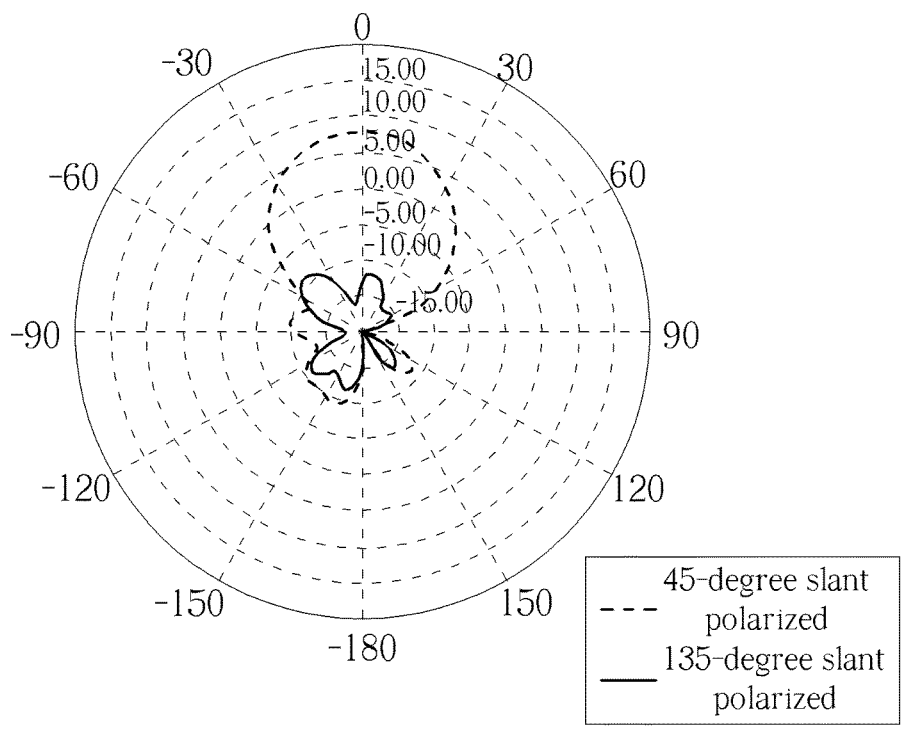
FIG. 4B is a schematic diagram illustrating radiation pattern of the 45-degree slant polarized antennas of two adjacent antenna units of the radio-frequency transceiver system shown in FIG. 1A operated at 1.85 GHz in the vertical plane in the combined-beam mode.
Figure 5A:
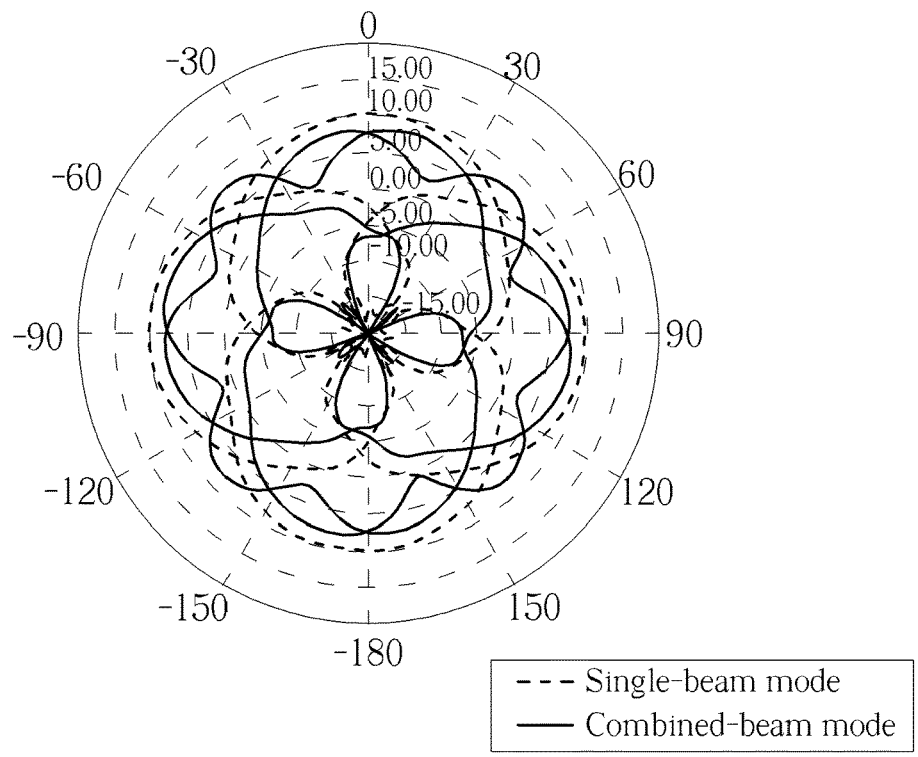
FIG. 5A is a schematic diagram illustrating the beam overlapping patterns of 45-degree slant polarized electromagnetic fields of the corresponding 45-degree slant polarized antennas of the first complex antenna shown in FIG. 1A operated at 1.85 GHz in the horizontal plane.
Figure 5B:
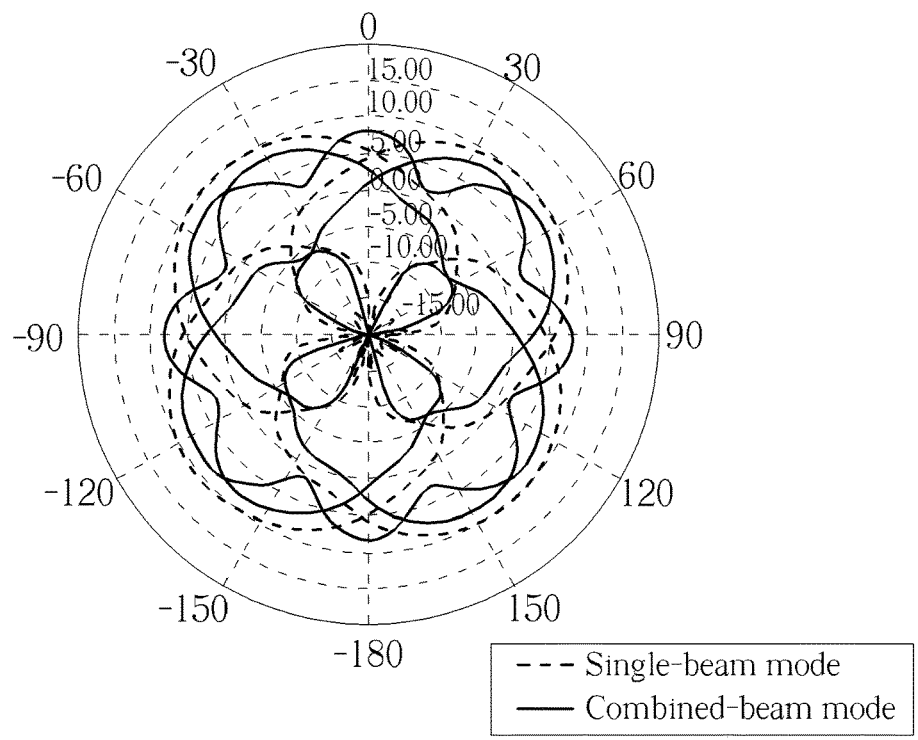
FIG. 5B is a schematic diagram illustrating the beam overlapping patterns of 45-degree slant polarized electromagnetic fields of the corresponding 45-degree slant polarized antennas of the second complex antenna shown in FIG. 1A operated at 1.85 GHz in the horizontal plane.

Please refer to FIG. 3A to FIG. 4B, Table 1 and Table 2. FIG. 3A is a schematic diagram illustrating radiation pattern of the 45-degree slant polarized antennas of an antenna unit (for example, the second antenna unit A2U4) of the radio-frequency transceiver system 10 operated at 1.85 GHz in the horizontal plane (i.e., the xz plane) in the single-beam mode. FIG. 3B is a schematic diagram illustrating radiation pattern of the 45-degree slant polarized antennas of an antenna unit (for example, the second antenna unit A2U4) of the radio-frequency transceiver system 10 operated at 1.85 GHz in the vertical plane (i.e., the xy plane) in the single-beam mode. FIG. 4A is a schematic diagram illustrating radiation pattern of the 45-degree slant polarized antennas of two adjacent antenna units (for example, the first antenna units A1U1 and A1U4) of the radio-frequency transceiver system 10 operated at 1.85 GHz in the horizontal plane in the combined-beam mode. FIG. 4B is a schematic diagram illustrating radiation pattern of the 45-degree slant polarized antennas of two adjacent antenna units (for example, the first antenna units A1U1 and A1U4) of the radio-frequency transceiver system 10 operated at 1.85 GHz in the vertical plane in the combined-beam mode. In FIG. 3A to FIG. 4B, radiation pattern of 45-degree slant polarized electromagnetic fields generated by the 45-degree slant polarized antennas is presented by a long dashed line, while radiation pattern of 135-degree slant polarized electromagnetic fields generated by the 45-degree slant polarized antennas is also presented by a solid line. According to FIG. 3A to FIG. 4B, the radio-frequency transceiver system 10 can meet the LTE wireless communication system requirements of having maximum gain value of the single-beam mode greater than 8 dBi, front-to-back (F/B) ratio greater than 20 dB and 3 dB beamwidth on the vertical plane larger than 30 degrees. FIG. 5A is a schematic diagram illustrating the beam overlapping patterns of 45-degree slant polarized electromagnetic fields of the corresponding 45-degree slant polarized antennas of the first complex antenna ANT1 operated at 1.85 GHz in the horizontal plane. FIG. 5B is a schematic diagram illustrating the beam overlapping patterns of 45-degree slant polarized electromagnetic fields of the corresponding 45-degree slant polarized antennas of the second complex antenna ANT2 operated at 1.85 GHz in the horizontal plane. The radiation patterns of 45-degree slant polarized electromagnetic fields generated by the corresponding 45-degree slant polarized antennas in the single-beam mode is presented by a long dashed line; the radiation patterns of 45-degree slant polarized electromagnetic fields generated by the corresponding 45-degree slant polarized antennas in the combined-beam mode is presented by a solid line. According to FIG. 5A and FIG. 5B, operating in the combined-beam mode may improve and raise the minimum gain value of the beam overlapping pattern of the radio-frequency transceiver system 10. Antenna pattern characteristic simulation results of the 45-degree slant polarized antennas of the radio-frequency transceiver system 10 operated at other frequencies or antenna pattern characteristic simulation results of the 135-degree slant polarized antennas of the radio-frequency transceiver system 10 are basically similar to aforementioned illustrations and hence are not detailed redundantly. Table 1 and Table 2 are simulation antenna characteristic tables for the 45-degree slant polarized antennas and the 135-degree slant polarized antennas of the radio-frequency transceiver system 10 versus different frequencies. According to Table 1 and Table 2, the maximum gain value (or antenna peak gain) of antenna unit (for example, the first antenna unit or the second antenna unit) in the single-beam mode is in a range of 9.75 to 10.8 dBi; the front to back ratio (F/B ratio) is at least 20.1 dB; the 3 dB beamwidth on the vertical plane is in a range of 35 to 49 degrees. Moreover, according to a 8-beam beam overlapping pattern (or overlapping gain pattern), the minimum overlapping gain value of the radio-frequency transceiver system 10 in operation is at least 6.37 dBi, and hence the radio-frequency transceiver system 10 meets the LTE wireless communication system requirements.

TABLE 1

| | Frequency (Mhz) | | | | | | | |
|---|---|---|---|---|---|---|---|---|
| | 1850 | 1910 | 1930 | 1990 | 2305 | 2315 | 2350 | 2360 |
| The maximum gain value of the 45-degree slant polarized antennas in the horizontal plane in the single-beam mode (dBi) | 10.3 | 10.5 | 10.6 | 10.7 | 10.4 | 10.5 | 10.7 | 10.8 |
| The 3 dB beamwidth of the 45-degree slant polarized antennas in the horizontal plane in the single-beam mode (degree) | 68 | 68 | 68 | 69 | 77 | 77 | 77 | 76 |
| The F/B ratio of the 45-degree slant polarized antennas in the horizontal plane in the single-beam mode (dB) | 22.2 | 23.3 | 23.7 | 23.7 | 23.0 | 23.5 | 23.0 | 23.3 |
| The 3 dB beamwidth of the 45-degree slant polarized antennas in the vertical plane in the single-beam mode (degree) | 47 | 45 | 44 | 42 | 37 | 37 | 35 | 35 |
| The minimum gain value of the beam overlapping pattern of the 45-degree slant polarized antennas (dBi) | 6.78 | 6.86 | 7.00 | 7.19 | 7.99 | 7.99 | 8.02 | 7.85 |
| The maximum gain value of the 45-degree slant polarized antennas in the horizontal plane in the combined-beam mode (dBi) | 8.04 | 8.43 | 8.38 | 8.67 | 9.51 | 9.50 | 9.40 | 9.27 |

TABLE 1-continued

| | Frequency (Mhz) | | | | | | | |
|---|---|---|---|---|---|---|---|---|
| | 1850 | 1910 | 1930 | 1990 | 2305 | 2315 | 2350 | 2360 |
| The 3 dB beamwidth of the 45-degree slant polarized antennas in the horizontal plane in the combined-beam mode (degree) | 44 | 45 | 43 | 44 | 22 | 22 | 38 | 37 |
| The F/B ratio of the 45-degree slant polarized antennas in the horizontal plane in the combined-beam mode (dB) | 22.7 | 23.0 | 25.4 | 22.3 | 20.8 | 20.8 | 20.1 | 20.1 |
| The 3 dB beamwidth of the 45-degree slant polarized antennas in the vertical plane in the combined-beam mode (degree) | 49 | 46 | 44 | 43 | 38 | 38 | 37 | 37 |

TABLE 2

| | frequency (Mhz) | | | | | | | |
|---|---|---|---|---|---|---|---|---|
| | 1850 | 1910 | 1930 | 1990 | 2305 | 2315 | 2350 | 2360 |
| The maximum gain value of the 135-degree slant polarized antennas in the horizontal plane in the single-beam mode (dBi) | 9.75 | 10.1 | 10.2 | 10.4 | 10.6 | 10.6 | 10.8 | 10.8 |
| The 3 dB beamwidth of the 135-degree slant polarized antennas in the horizontal plane in the single-beam mode (degree) | 68 | 68 | 69 | 69 | 76 | 76 | 75 | 75 |
| The F/B ratio of the 135-degree slant polarized antennas in the horizontal plane in the single-beam mode (dB) | 21.6 | 23.0 | 23.2 | 24.0 | 23.5 | 23.6 | 23.8 | 24.0 |
| The 3 dB beamwidth of the 135-degree slant polarized antennas in the vertical plane in the single-beam mode (degree) | 47 | 45 | 44 | 42 | 36 | 36 | 35 | 35 |
| The minimum gain value of the beam overlapping pattern of the 135-degree slant polarized antennas (dBi) | 6.37 | 6.74 | 6.69 | 7.01 | 7.74 | 7.86 | 7.93 | 7.93 |
| The maximum gain value of the 135-degree slant polarized antennas in the horizontal plane in the combined-beam mode (dBi) | 7.47 | 8.05 | 8.06 | 8.38 | 9.50 | 9.51 | 9.48 | 9.41 |
| The 3 dB beamwidth of the 135-degree slant polarized antennas in the horizontal plane in the combined-beam mode (degree) | 43 | 44 | 40 | 43 | 22 | 22 | 21 | 41 |
| The F/B ratio of the 135-degree slant polarized antennas in the horizontal plane in the combined-beam mode (dB) | 22.2 | 22.6 | 26.3 | 22.1 | 22.1 | 21.9 | 20.9 | 20.5 |
| The 3 dB beamwidth of the 135-degree slant polarized antennas in the vertical plane in the combined-beam mode (degree) | 48 | 45 | 43 | 42 | 39 | 38 | 37 | 37 |

Figure 6:
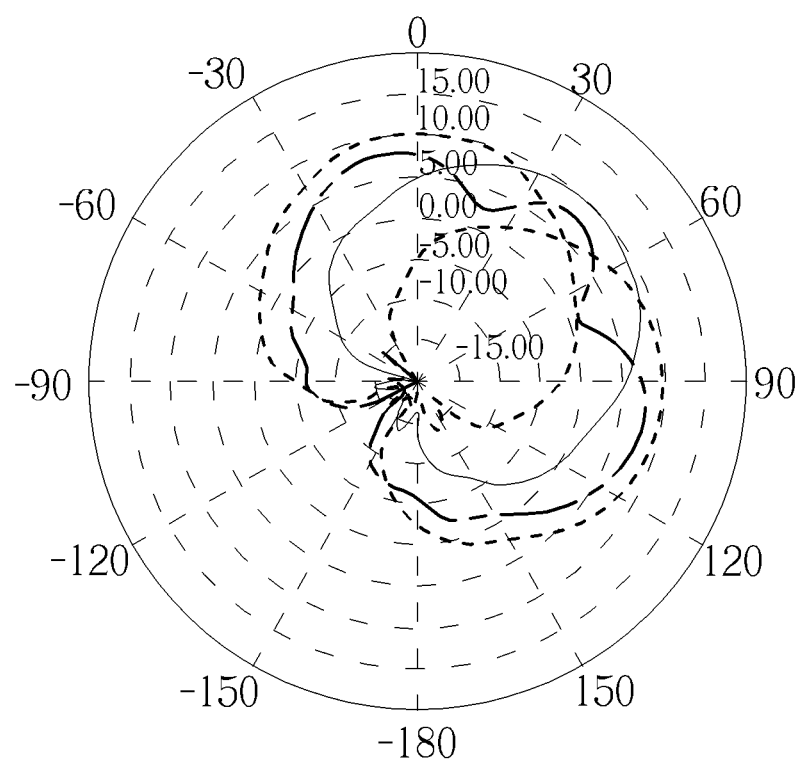
FIG. 6 is a schematic diagram illustrating radiation pattern of 45-degree slant polarized electromagnetic fields of the corresponding 45-degree slant polarized antennas of the first complex antenna and the second complex antenna of the radio-frequency transceiver system shown in FIG. 1A operated at 1.85 GHz in the horizontal plane.

Please refer to FIG. 6 and Table 3. FIG. 6 is a schematic diagram illustrating radiation pattern of 45-degree slant polarized electromagnetic fields of the corresponding 45-degree slant polarized antennas of the first complex antenna and the second complex antenna of the radio-frequency transceiver system 10 operated at 1.85 GHz in the horizontal plane. The radiation pattern of 45-degree slant polarized electromagnetic fields of the first antenna units (for example, the first antenna unit A1U1 and the first antenna unit A1U2) operated in the single-beam mode is presented by a short dashed line; the radiation pattern of 45-degree slant polarized electromagnetic fields of the first antenna units (for example, the first antenna unit A1U1 and the first antenna unit A1U2) operated in the combined-beam mode is presented by a long dashed line; the radiation pattern of 45-degree slant polarized electromagnetic fields of the second antenna unit (for example, the second antenna unit A2U1) operated in the single-beam mode is presented by a solid line. Antenna pattern characteristic simulation results of the 45-degree slant polarized antennas of the radio-frequency transceiver system 10 operated at other frequencies or antenna pattern characteristic simulation results of the 135-degree slant polarized antennas of the radio-frequency transceiver system 10 are basically similar to aforementioned illustrations and hence are not detailed redundantly. Table 3 is a gain imbalance table for the corresponding 45-degree slant polarized antennas and the corresponding 135-degree slant polarized antennas of the first complex antenna and the second complex antenna of the radio-frequency transceiver system 10 versus different frequencies. According to FIG. 6 and Table 3, gain imbalance (or gain value difference) between the first antenna unit and the second antenna unit is 3.93 dB to the maximum. Furthermore, by properly adjusting the geometrical shape, the structure and the size of the radio-frequency transceiver system 10, the gain value in the combined-beam mode increases while the gain imbalance decreases.

TABLE 3

| Frequency | The maximum gain value difference between the 45-degree slant polarized antennas | The maximum gain value difference between the 135-degree slant polarized antennas |
|---|---|---|
| 1850 Mhz | 3.93 dB | 3.27 dB |
| 1910 Mhz | 3.65 dB | 3.15 dB |
| 1930 Mhz | 3.46 dB | 3.36 dB |
| 1990 Mhz | 3.35 dB | 3.27 dB |
| 2305 Mhz | 2.66 dB | 2.84 dB |
| 2315 Mhz | 2.68 dB | 2.76 dB |
| 2350 Mhz | 2.97 dB | 2.87 dB |
| 2360 Mhz | 2.78 dB | 2.85 dB |

Please refer to Table 4 and Table 5. Table 4 is an envelope correlation coefficient table for the first antenna unit and the second antenna unit both operatized in the single-beam mode in the radio-frequency transceiver system 10 versus different frequencies. Table 5 is an envelope correlation coefficient table for the first antenna units operatized in the combined-beam mode and the second antenna unit operatized in the single-beam mode in the radio-frequency transceiver system 10 versus different frequencies. In the prior art, when two adjacent antenna units are operatized in the single-beam mode, the envelope correlation coefficient should be worse and close to 1. However, Table 4 shows that the envelope correlation coefficient of two adjacent radiation beams when both the first antenna unit (for example, the first antenna unit A1U1) and the second antenna unit (for example, the second antenna unit A2U1) of the radio-frequency transceiver system 10 are operatized in the single-beam mode, and the envelope correlation coefficient shown in Table 4 is at least less than 0.1176, which is better than the prior art of record. Table 4 also shows that the envelope correlation coefficient of two nonadjacent radiation beams when both the first antenna unit (for example, the first antenna unit A1U1) and the second antenna unit (for example, the second antenna unit A2U2) of the radio-frequency transceiver system 10 are operatized in the single-beam mode, and the envelope correlation coefficient shown in Table 4 is at least less than 0.0013, which is much closer to 0 than the envelope correlation coefficient of two adjacent radiation beams. Table 5 shows that the envelope correlation coefficient of two adjacent radiation beams when the first antenna units (for example, the first antenna unit A1U1 and the first antenna unit A1U2) operatized in the combined-beam mode and the second antenna unit (for example, the second antenna unit A2U1) operatized in the single-beam mode in the radio-frequency transceiver system 10. According to Table 5, the envelope correlation coefficient is at least less than 0.073 when the two adjacent radiation beams correspond to the same spatial position. Consequently, by switching the first complex antenna ANT1 and the second complex antenna ANT2 between a single-beam mode and a combined-beam mode, the performance of 4×4 MIMO technology applications of the radio-frequency transceiver system 10 is ensured.

TABLE 4

| frequency | The envelope correlation coefficient when the first antenna unit A1U1 and the second antenna unit A2U1 are operatized in the single-beam mode | The envelope correlation coefficient when the first antenna unit A1U1 and the second antenna unit A2U2 are operatized in the single-beam mode |
|---|---|---|
| 1850 Mhz | 0.1132 | 0.0002 |
| 1910 Mhz | 0.1162 | 0.0004 |
| 1930 Mhz | 0.1163 | 0.0004 |
| 1990 Mhz | 0.1176 | 0.0005 |
| 2305 Mhz | 0.0956 | 0.0013 |
| 2315 Mhz | 0.0938 | 0.0012 |
| 2350 Mhz | 0.0904 | 0.0008 |
| 2360 Mhz | 0.0901 | 0.0008 |

TABLE 5

| Frequency | The envelope correlation coefficient when the first antenna units A1U1, A1U2 are operatized in the combined-beam mode and the second antenna unit A2U1 is operatized in the single-beam mode |
|---|---|
| 1850 Mhz | 0.057 |
| 1910 Mhz | 0.059 |
| 1930 Mhz | 0.059 |
| 1990 Mhz | 0.064 |
| 2305 Mhz | 0.07 |
| 2315 Mhz | 0.071 |
| 2350 Mhz | 0.073 |
| 2360 Mhz | 0.072 |

The radio-frequency transceiver system 10 is an exemplary embodiment of the invention, and those skilled in the art may make alternations and modifications accordingly. For example, according to requirements for gain value, each antenna unit (for example, the first antenna unit A1U1) may have an array antenna structure and comprises the first antenna element and the second antenna element; nevertheless, the present invention is not limited herein, and each antenna unit may comprise more than two antenna elements. Alternatively, it does not require one antenna unit to have an array antenna structure. According to frequencies and bandwidths of the radio-frequency transceiver system, the reflective plate (for example, the reflective plate 120*a*_A1U1) of an antenna unit (for example, the first antenna unit A1U1) may be removed from one antenna element, and the conductor plates (for example, the conductor plates 1411*a*_A1U1 and 1412*a*_A1U1) of the radiation unit (for example, the radiation unit 141*a*_A1U1) of an antenna unit (for example, the first antenna unit A1U1) may have other antenna structures except the diamond dipole antenna structure. Because location heights of the two radiation units (for example, the radiation units 141*a*_A1U1, 142*a*_A1U1) in antenna element (for example, the first antenna element or the second antenna element) of an antenna unit (for example, the first antenna unit A1U1 shown in FIG. 1B) with respect to the central reflective element (i.e., the central reflective element 195_A1U1) may differ, lengths or dimensions of the two radiation units may be properly adjusted to optimize the return loss. Specifically, the length of the radiation unit having higher location height is shorter than the length of the radiation unit having lower location height since the return loss of the radiation unit having higher location height (i.e., the radiation unit 142a_A1U1) is better under low frequency and since the return loss of the radiation unit having lower location height (i.e., the radiation unit 141a_A1U1) is better under high frequency. Furthermore, because beamwidth in the combined-beam mode is narrower, the first complex antenna ANT1 and the second complex antenna ANT2 may be operated in the single-beam mode concurrently. In certain system specification, the radio-frequency transceiver system 10 may not be operated in the combined-beam mode.

Figure 7A:
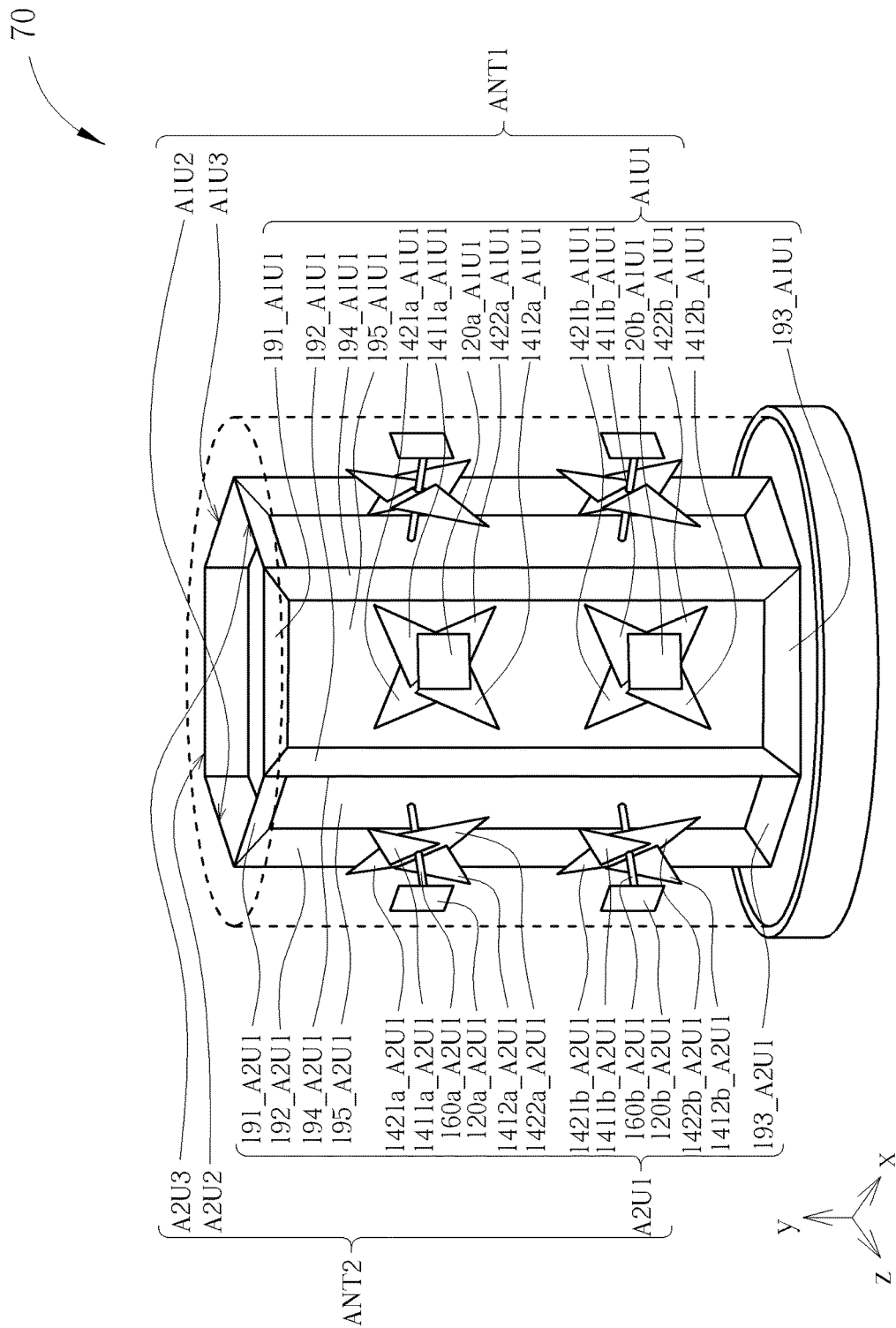
FIG. 7A is a schematic diagram illustrating a radio-frequency transceiver system according to an embodiment of the present invention.
Figure 7B:
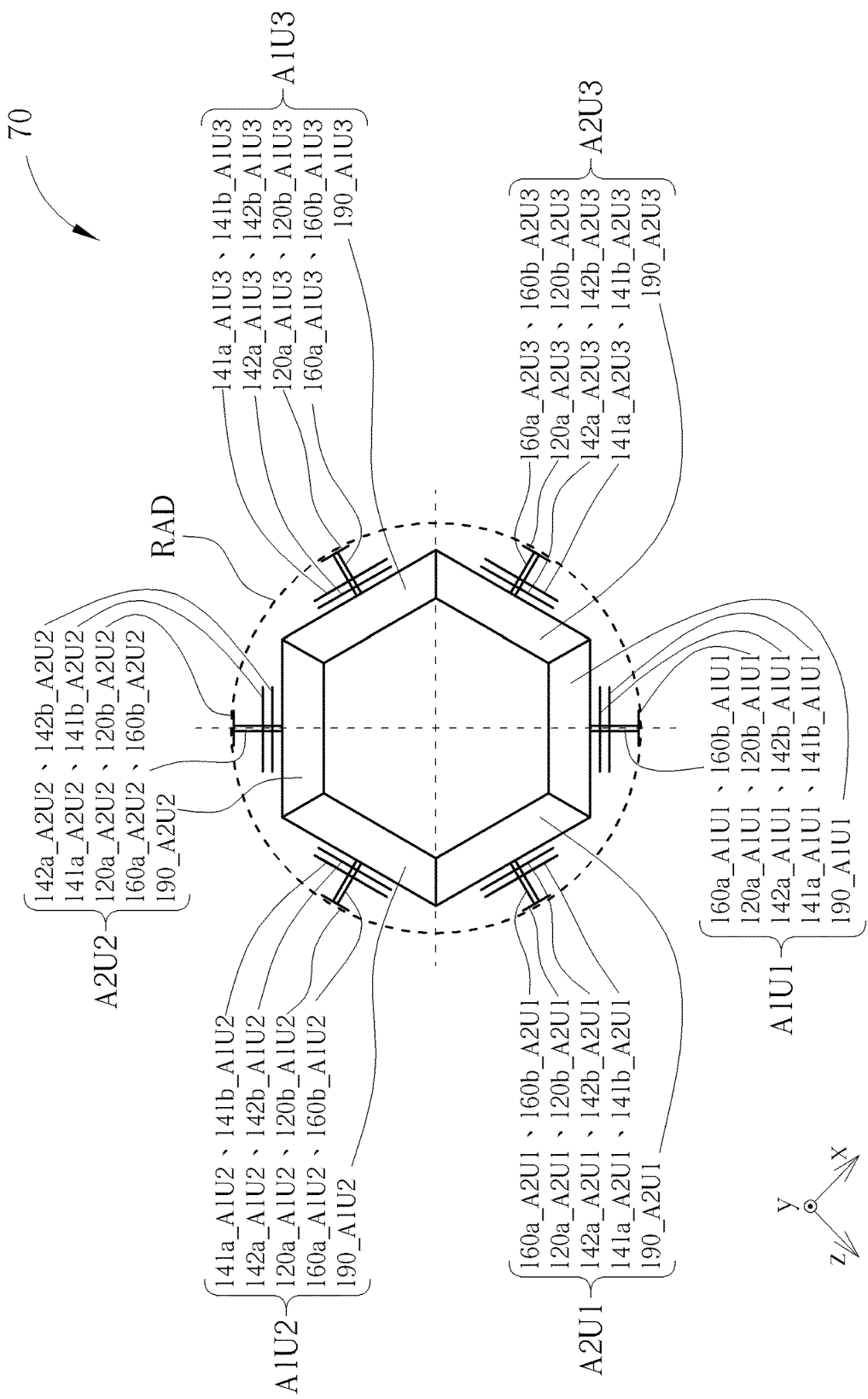
FIG. 7B is a schematic diagram illustrating a top view of the radio-frequency transceiver system shown in FIG. 7A.

Besides, in practice the radio-frequency transceiver system may comprise N antenna units, wherein N may be any arbitrary even numbers. In some embodiments, the number of the first antenna units is not less than 3, and the number of the second antenna units is not less than 3. For example, Please refer to FIG. 7A and FIG. 7B. FIG. 7A is a schematic diagram illustrating a radio-frequency transceiver system 70 according to an embodiment of the present invention. FIG. 7B is a schematic diagram illustrating a top view of the radio-frequency transceiver system 70. The structure of the radio-frequency transceiver system 70 is similar to that of the radio-frequency transceiver system 10 shown in FIG. 1A and FIG. 1B so that the same numerals and symbols denote the same components in the following description. Unlike the radio-frequency transceiver system 10, the first complex antenna ANT1 and the second complex antenna ANT2 of the radio-frequency transceiver system 70 merely comprise the first antenna units A1U1, A1U2, A1U3 and the second antenna units A2U1, A2U2, A2U3 respectively. Namely, the first antenna units A1U1 to A1U3 and the second antenna units A2U1 to A2U3 having the same structure and size merely divide the cylindrical radome RAD up into 6 equal sections each having the same space angle. A projection of the radio-frequency transceiver system 70 orthogonally projected onto the horizontal plane is symmetrical with respect to 6 symmetrical axes.

Figure 8:
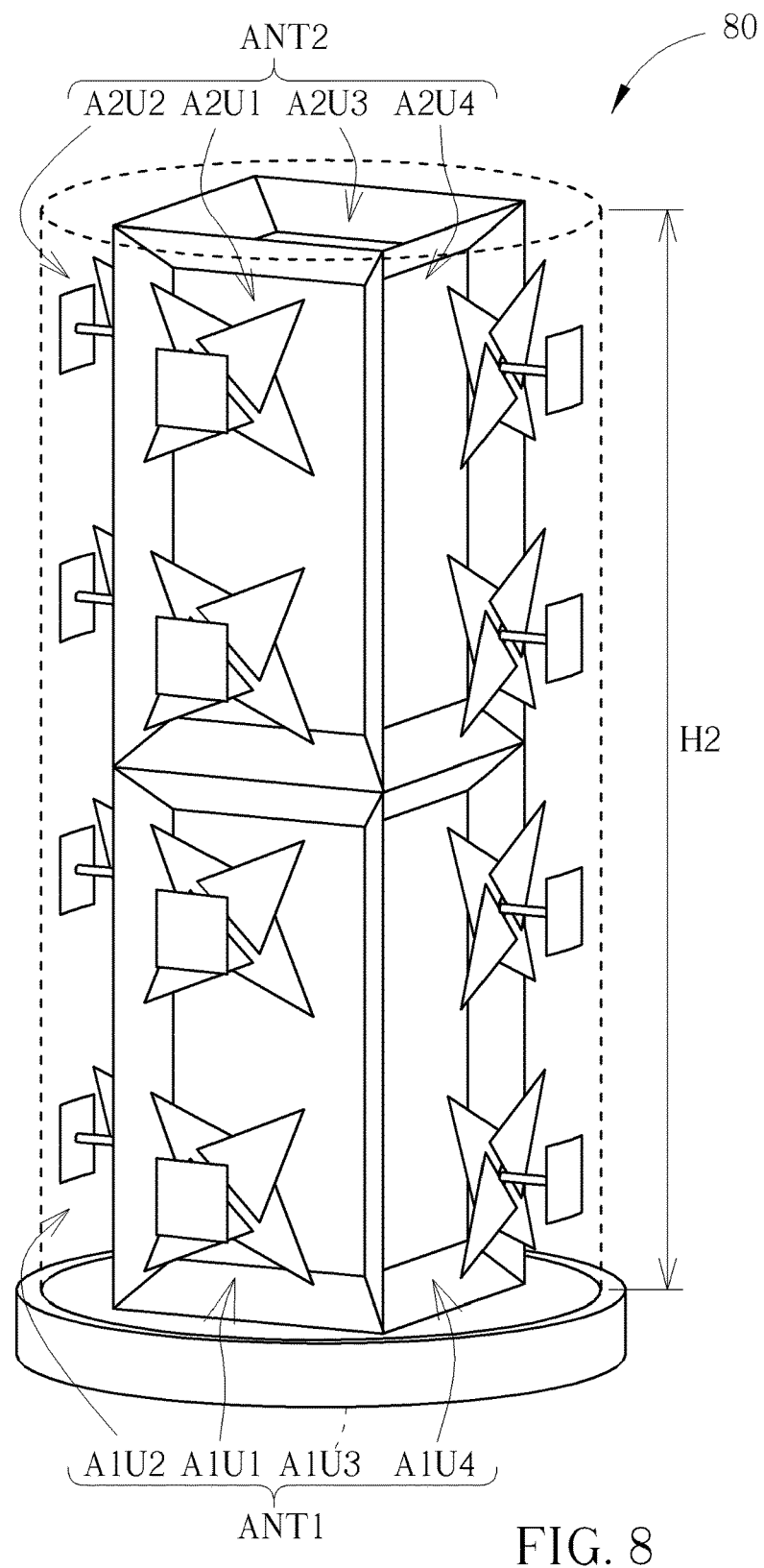
FIG. 8 is a schematic diagram illustrating a radio-frequency transceiver system according to an embodiment of the present invention.

Moreover, please refer to FIG. 8. FIG. 8 is a schematic diagram illustrating a radio-frequency transceiver system 80 according to an embodiment of the present invention. The structure of the radio-frequency transceiver system 80 is similar to that of the radio-frequency transceiver system 10 shown in FIG. 1A and FIG. 1B so that the same numerals and symbols denote the same components in the following description. Unlike the radio-frequency transceiver system 10, the second complex antenna ANT2 of the radio-frequency transceiver system 80 is stacked on the first complex antenna ANT1, and the first antenna units A1U1 to A1U4 and the second antenna units A2U1 to A2U4 are regularly and alternately arranged to form an annular structure respectively. Although a height H2 of the radio-frequency transceiver system 80, which is higher than the height H1 of the radio-frequency transceiver system 10, hinders ejection procedures during an injection molding process for the radome RAD, individual single-beam field patterns of the first antenna units A1U1 to A1U4 and the second antenna units A2U1 to A2U4 are not shielded mutually because the second complex antenna ANT2 is disposed on the first complex antenna ANT1. Moreover, the first antenna units A1U1 to A1U4 of the first complex antenna ANT1 and the second antenna units A2U1 to A2U4 of the second complex antenna ANT2 are disposed in the cylindrical radome RAD completely to share one signal processing module (not shown). The signal processing module integrally processes signals transmitted from or received by the first complex antenna ANT1 and the second complex antenna ANT2 in order to synchronize signals transmitted between the first complex antenna ANT1 and a baseband radio processor (not shown) of the signal processing module and between the second complex antenna ANT2 and the baseband radio processor. In this way, signals transmitted between the first complex antenna ANT1 and the baseband radio processor and between the second complex antenna ANT2 and the baseband radio processor are synchronized.

In the prior art, when the number of antennas increase for MIMO communication technology, distances between the antennas would be so limited that affects antenna field patterns or shields transmission signals, which can threaten the efficiency of MIMO communication technology. If the distances between the antennas increase, asynchronous signals bring extra problems that must be solved. Moreover, expanding physical dimensions does not accommodate the trend for smaller-sized electronic products.

On the other hand, since the first antenna units and the second antenna units of the present invention are disposed in one single cylindrical radome completely, asynchronous signal problems and field pattern shielding problems can be solved, and the size and the cost are reduced. As the first antenna units and the second antenna units are regularly and alternately arranged to form an annular structure, the first complex antenna can be switched between a single-beam mode and a combined-beam mode corresponding to whether the second complex antenna is operated in the single-beam mode or in the combined-beam mode. As a result, even corresponding to the same spatial position, the envelope correlation coefficient between the first complex antenna and the second complex antenna is small, thereby enhancing the performance of 4×4 MIMO communication technology applications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A radio-frequency transceiver system, configured to support multiple-input multiple-output communication technology, comprising:
   a first complex antenna, comprising a plurality of first antenna units; and
   a second complex antenna, comprising a plurality of second antenna units;
   wherein the plurality of first antenna units and the plurality of second antenna units are regularly and alternately arranged to form an annular structure, and the first complex antenna and the second complex antenna are switched between a single-beam mode and a combined-beam mode respectively to transmit or receive radio-frequency signals;
   wherein in the combined-beam mode, field patterns of the plurality of first antenna units adjacent to each other in the first complex antenna or field patterns of the plurality of second antenna units adjacent to each other in the second complex antenna are synthesized into a composite field pattern;
   wherein one of the first complex antenna and the second complex antenna operates in the single-beam mode, and one another of the first complex antenna and the second complex antenna operates in the combined-beam mode, to compensate for an attenuation of a gain value of each individual single-beam field pattern of adjacent antenna units near an intersection of the first complex antenna and the second complex antenna;
wherein each of the plurality of first antenna units or each of the plurality of second antenna units comprises:
  a reflective unit, comprising:
    a central reflective element; and
    a plurality of peripheral reflective elements, enclosing the central reflective element to form a frustum structure; and
  at least one antenna element, each of the at least one antenna element comprising:
    at least one radiation unit, disposed above the central reflective element; and
    a reflective plate, disposed above the at least one radiation unit, wherein a geometrical shape of the reflective plate has symmetry.

2. The radio-frequency transceiver system of claim 1, wherein each of the plurality of first antenna units is adjacently disposed between two of the plurality of second antenna units, and each of the plurality of second antenna units is adjacently disposed between two of the plurality of first antenna units.

3. The radio-frequency transceiver system of claim 1, wherein the plurality of first antenna units and the plurality of second antenna units have identical structure and size.

4. The radio-frequency transceiver system of claim 1, wherein each of the plurality of first antenna units or each of the plurality of second antenna units has an array antenna structure.

5. The radio-frequency transceiver system of claim 1, wherein the geometrical shape of the reflective plate is a circle or a regular polygon, and a number of vertices of the regular polygon is a multiple of 4.

6. The radio-frequency transceiver system of claim 1, wherein a first conductor plate and a second conductor plate of the at least one radiation unit form a diamond dipole antenna structure.

7. The radio-frequency transceiver system of claim 1, wherein each central reflective element of the plurality of first antenna units and each central reflective element of the plurality of second antenna units are perpendicular to a first plane, and a projection of the radio-frequency transceiver system onto the first plane is symmetrical with respect to at least one symmetrical axis.

8. The radio-frequency transceiver system of claim 1, wherein a number of the plurality of first antenna units is not less than 3, and a number of the plurality of second antenna units is not less than 3.

9. The radio-frequency transceiver system of claim 1, further comprising a signal processing module, wherein the signal processing module is configured to integrally process signals transmitted from or received by the first complex antenna and the second complex antenna, the signal processing module comprises one baseband radio processor, and signals transmitted between the first complex antenna and the baseband radio processor and between the second complex antenna and the baseband radio processor are synchronized.

* * * * *